United States Patent Office 3,013,979
Patented Dec. 19, 1961

3,013,979
TIN AND MANGANESE ACTIVATED PYRO-
PHOSPHATE PHOSPHORS
Peter Whitten Ranby, London, England, assignor to Thorn
Electrical Industries Limited, London, England, a British company
No Drawing. Continuation of application Ser. No. 276,043, Mar. 11, 1952. This application Aug. 24, 1959, Ser. No. 835,412
1 Claim. (Cl. 252—301.4)

The present invention relates to luminescent materials for use for example in fluorescent discharge lamps and in the formation of cathode ray tube screens and X-ray screens.

Luminescent materials comprising calcium pyrophosphate activated by tin have been proposed in British patent specification No. 578,272. The heating conditions disclosed in that specification are such that the tin compound in the matrix must be in the stannic state. These luminescent materials can be excited by cathode rays but not by the 2537 or 3650 A.U. radiations.

Other luminescent materials have been described in the specification of our co-pending application No. 262,677, now abandoned, these materials comprising the pyrophosphate of one or more of the bivalent metals magnesium, strontium, barium or zinc activated with tin or with both tin and manganese, the composition of the pyrophosphate being such that the molecular ratio of bivalent metal oxide to phosphorus pentoxide lies between the limits 2:0.9 and 2:1.4.

According to the present invention an artificial luminescent material comprises the pyrophosphates of the bivalent metal calcium and of one or more of the bivalent metals magnesium, strontium, barium or zinc, activated with tin or with both tin and manganese, the proportion of tin being not less than 0.05%, by weight, of the luminescent material, the composition being such that the molecular ratio of metal oxide (excluding the tin activator) to phosphorus pentoxide lies between the limits 2:0.9 and 2:1.4, and the amount of calcium constituting not more than 98 molecular percent, of the total bivalent metal (excluding the tin activator or the tin and manganese activators) in the material. Preferably, the proportion of tin is not more than 10% by weight, of the luminescent material.

Manganese may be added to replace up to about one-half of the bivalent metal content (excluding the tin activator) of the luminescent material or matrix. It is sometimes of advantage to first prepare the pyrophosphate matrix and then to incorporate the activating tin compound therein by heating under non-oxidising conditions.

Theoretically the pyrophosphates of bivalent metals contain metal oxide and phosphorus pentoxide in the ratio of 2:1 respectively. However, a certain limited latitude in this ratio is permitted and the present invention is concerned only with luminescent materials in which the molecular ratio lies within the limits specified above as being according to the present invention. It has been found that slight changes in the said molecular ratio within the limits specified may produce marked changes in the colour of the fluoresence produced by the luminescent material.

It is at present believed that at least some of the manganese incorporated in materials in accordance with this invention replaces at least some of the bivalent metal present in the matrix. When calculating the ratio of the bivalent metal oxide to phosphorus pentoxide in materials in accordance with this invention the tin is disregarded but the amount of manganese, if manganese is present, is included in the total of the bivalent metal. When calculating the percentage of calcium present in the material, relatively to the total bivalent metal in the material, both the tin and the manganese, if the latter is present, are disregarded.

In carrying out the present invention, if luminescent materials having the maximum intensity of fluorescence are to be produced it is essential that the temperature of preparation of the materials be kept below the sintering temperature. The actual temperatures required for the preparation of the materials of the present invention vary in accordance with the particular bivalent metals used and with the proportion of tin activator or tin and manganese activators. In all cases, however, the temperatures of preparation are below the respective sintering temperatures. Apart from ensuring that the maximum intensity of fluorescence is obtained, this heat treatment below the sintering temperature also has the advantage that the resultant luminescent materials are in the form of fine powders, which are more suitable for use in, for example, a fluorescent lamp than are materials which have been melted or even sintered.

In order to obtain the maximum intensity of fluorescence it also appears necessary for the tin to be in a valency state lower than that of stannic tin. Thus, stannous compounds such as theoxide, chloride and phosphate may be used as starting material in the preparation of the pyrophosphate luminescent materials of the present invention, and to prevent the starting material from undergoing oxidation to a higher valency state during the thermal preparation of the luminescent material, it is important that this heat treatment be carried out under non-oxidising conditions. This may be done by heating the mixture in a plugged tube or a covered crucible or by heating it in a non-oxidising atmosphere of, for example, steam or nitrogen or mixtures thereof or mixtures of hydrogen with steam or nitrogen or both.

If the tin compound used in the mixture before heating is a stannic compound the atmosphere during the heat treatment should be such that the compound is reduced to the stannous state.

When manganese is incorporated as a secondary activator the luminescence becomes of longer wavelength than when tin alone is used.

Table I below shows the effect on the colour of the luminescence of typical materials on replacing calcium in the luminescent material with progessively increasing, chemically equivalent proportions of strontium. All the materials are activated by 3% of tin; the effect of varying the proportion of manganese activator present is also shown. The ratio of the number of molecules of calcium, strontium and manganese oxides to the number of molecules of phosphorus, pentoxide is 2:1.1 in all the examples.

TABLE I

| Molecular Ratio CaO | Molecular Ratio SrO | No Mn | 1.75% Mn | 3.7% Mn | 7.4% Mn |
|---|---|---|---|---|---|
| 100 | ------ | Very weak blue | Weak yellowish | Weak yellowish | Weak yellowish. |
| 96⅞ | 3⅛ | Weak blue | Bright yellow | Yellow | Weak yellow. |
| 93¾ | 6¼ | Deep blue | ----do---- | Bright yellow | Do. |
| 87½ | 12½ | ----do---- | Orange | Bright orange pink | Pink. |
| 75 | 25 | Blue | Pink | Bright pink | Bright orange-pink. |
| 50 | 50 | Bright blue | ----do---- | ----do---- | Do. |
| 25 | 75 | ----do---- | Pale pink | Bright orange-pink | Orange-pink. |
| ------ | 100 | ----do---- | Whitish | Pink-white | Pale pink. |

Table II below shows the effect on the colour of the luminescence of typical materials on replacing the calcium in the luminescent material with progressively increasing, chemically equivalent proportions of barium, magnesium and zinc respectively. All the materials are activated by 3% of tin and about 3% of manganese. The ratio of the number of molecules of bivalent metal and manganese oxides to the number of molecules of phosphorus pentoxide is 2:1.1 in all the examples.

TABLE II

| Molecular Ratio MO | Molecular Ratio CaO | MO=BaO | MO=MgO | MO=ZnO |
|---|---|---|---|---|
| 0 | 100 | Weak yellowish | Weak yellowish | Weak yellowish. |
| 25 | 75 | Red | Pink | Pinkish. |
| 50 | 50 | Deep pink | Pinkish | Pink-red. |
| 75 | 25 | Pink | Pinkish | Pink. |

Methods of preparing luminescent materials in accordance with the invention will now be described, by way of example. All the materials used should be of the high degree of purity which is recognised in the art to be necessary for the preparation of luminescent materials.

*Example 1*

37 gm. of strontium carbonate, 25 gm. of calcium carbonate, 70 gm. of diammonium hydrogen phosphate $(NH_4)_2HPO_4$, 10 gm. of manganese phosphate and 3 gm. of stannous chloride are intimately mixed together and then heated in a plugged silica tube for ½ hour at 900° C. When cool the product is ground and can be reheated in steam for ½ hour. The material is a white powder and shows a bright pink fluorescence when excited by 2537 A.U. radiation and an orange-pink fluorescence when excited by longer wavelength ultra-violet radiations, such as that of wavelength 3650 A.U.

*Example 2*

| | Gms. |
|---|---|
| Calcium hydrogen phosphate ($CaHPO_4$) | 46.5 |
| Strontium hydrogen phosphate ($SrHPO_4$) | 3.3 |
| Ammonium dihydrogen phosphate ($NH_4H_2PO_4$) | 2.8 |
| Stannous chloride ($SnCl_2 2H_2O$) | 2.5 |
| Manganese phosphate | 2.3 | are intimately mixed together and then heated at 1100° C. in steam for half an hour. When cool, the product is ground and reheated at 1100° C. in steam for a further half an hour. The resulting material shows a bright yellow-orange fluorescence under excitation by 2537 A.U. radiation.

*Example 3*

| | Gms. |
|---|---|
| Calcium hydrogen phosphate | 34 |
| Strontium hydrogen phosphate | 46 |
| Diammonium hydrogen phosphate | 6 |
| Stannous chloride | 3 |
| Manganese phosphate | 10 | are intimately mixed together and then heated at 900° C. in steam for half an hour. When cool, the product is ground and reheated at 900° C. in steam for a further half an hour. The material shows a bright pink-red fluorescence under excitation by 2537 A.U. radiation.

*Example 4*

| | Gms. |
|---|---|
| Calcium carbonate | 12.5 |
| Barium carbonate | 24.6 |
| Diammonium hydrogen phosphate | 35.0 |
| Stannous chloride | 3.0 |
| Manganese phosphate | 5.0 | are intimately mixed together and then heated in a covered silica crucible for 5 minutes at 900° C. When cool, the product is ground and then heated for half an hour at 900° C. in steam. The resulting material shows a pale pink fluorescence under excitation by 2537 A.U. radiation.

*Example 5*

If the method of Example 4 is modified by using:

| | Gms. |
|---|---|
| Calcium carbonate | 8.35 |
| Strontium carbonate | 12.3 |
| Barium carbonate | 16.5 |
| Diammonium hydrogen phosphate | 35.0 |
| Stannous chloride | 3.0 |
| Manganese phosphate | 5.0 | the resulting material shows a pink fluorescence under excitation by 2537 A.U. radiation.

*Example 6*

| | Gms. |
|---|---|
| Calcium carbonate | 2.5 |
| Zinc oxide | 2.0 |
| Diammonium hydrogen phosphate | 1.25 |
| Manganese phosphate | 1.0 | are intimately mixed together and then heated for half an hour in a covered silica crucible at 600° C. When cool, the product is ground with 4 percent by weight of stannous oxide and then heated for a quarter of an hour at 900° C. in steam. The resulting material shows a reddish fluorescence under excitation by 2537 A.U. radiation.

Obviously, other compounds of calcium, strontium, barium, magnesium, phosphorus, manganese and tin may be used as starting materials provided that the composition of the material resulting from the heat treatment is the same. Permissible variations in the heating schedule will be apparent to those skilled in the art. The conditions during the heat treatment should be such that the tin compound, if in the stannous state, does not become oxidised to the stannic state or, if in the stannic state, is reduced to the stannous state.

This application is a continuation of my copending application Serial No. 276,043, filed March 11, 1952, now abandoned, for Luminescent Materials.

I claim:

An artificial luminescent material consisting essentially of calcium magnesium pyrophosphate in which the molecular ratio of calcium plus magnesium to the pyrophosphate radical is about 2.1, the pyrophosphate being activated by an activator selected from the group consisting of tin alone, and tin plus manganese together, the proportion of tin being not more than 10% and not less than 0.05% by weight of the luminescent material, the manganese content being about 3% by weight, and the amount of magnesium being between 25 and 75 molecular percent of the total amount of calcium plus magnesium.

References Cited in the file of this patent

UNITED STATES PATENTS

| | | |
|---|---|---|
| 2,270,124 | Huniger et al. | Jan. 13, 1942 |
| 2,619,471 | Butler | Nov. 25, 1952 |

FOREIGN PATENTS

| | | |
|---|---|---|
| 578,272 | Great Britain | June 21, 1946 |